April 30, 1968     S. CLAVE ETAL     3,380,335
OBSERVATION PORT
Filed Feb. 28, 1964     3 Sheets-Sheet 1
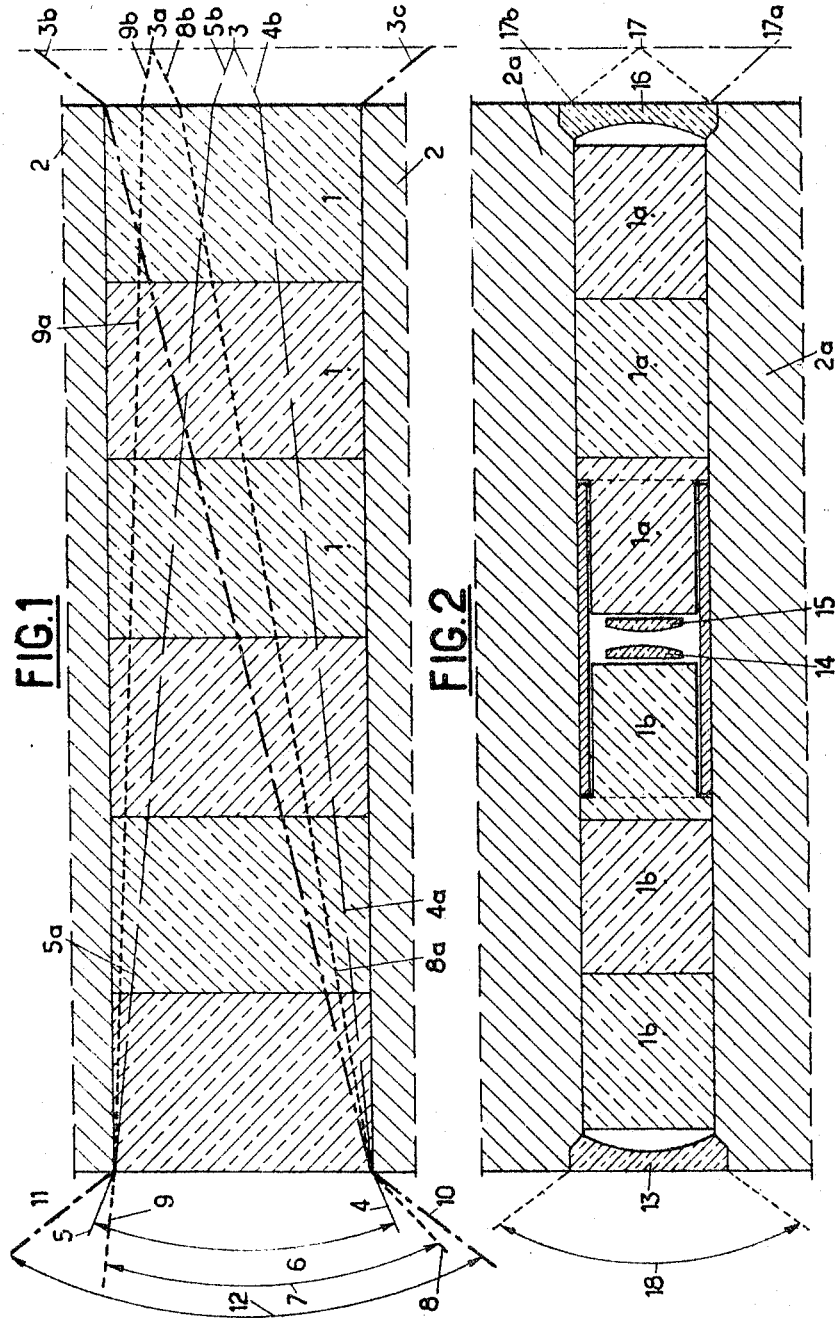
INVENTORS
Serge Clave
Marcel Clave
ATTORNEYS

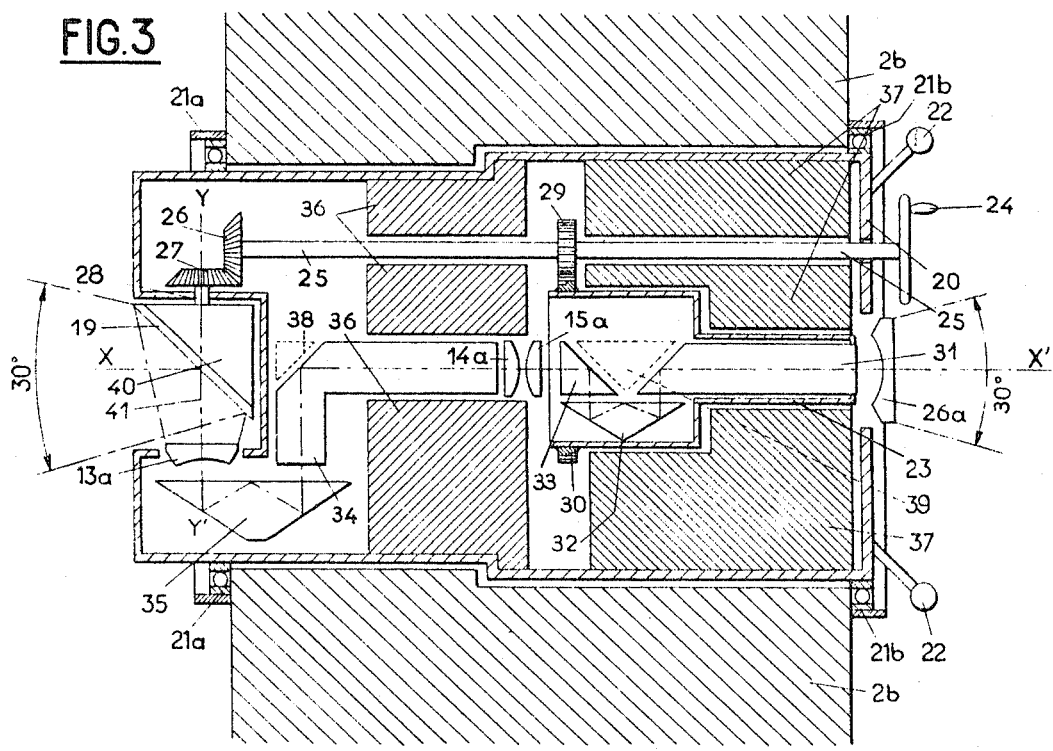

April 30, 1968 S. CLAVE ETAL 3,380,335
OBSERVATION PORT
Filed Feb. 28, 1964 3 Sheets-Sheet 3
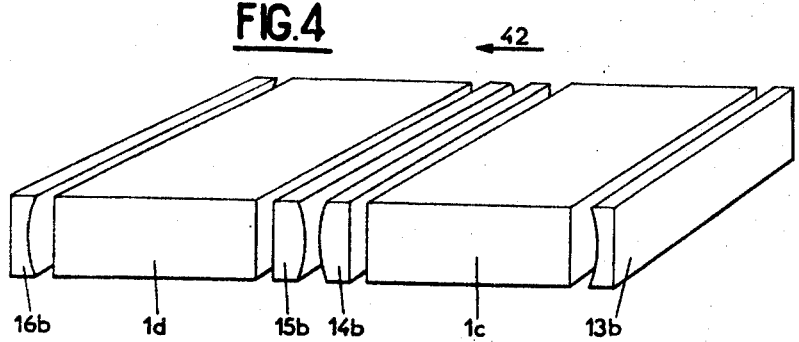
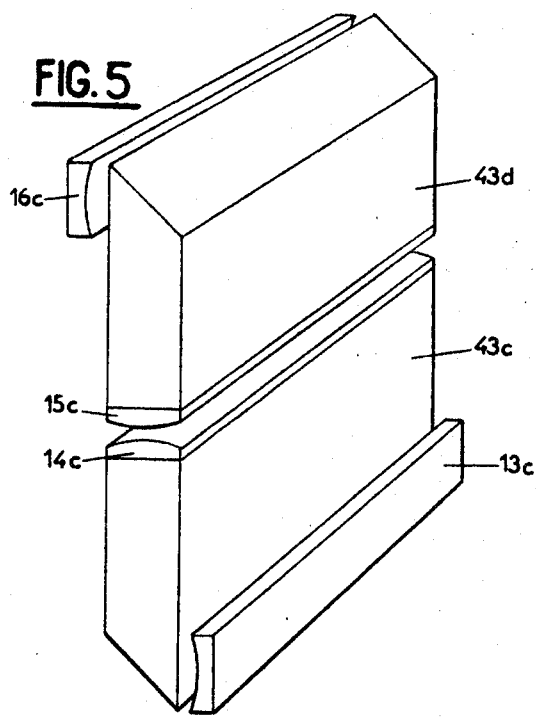
INVENTORS
S. Clavé
M. Clavé
ATTORNEY

United States Patent Office 3,380,335
Patented Apr. 30, 1968

3,380,335
OBSERVATION PORT
Serge Clave and Marcel Clave, both of
9 Rue Olivier-Metra, Paris, France
Continuation-in-part of application Ser. No. 170,579,
Feb. 1, 1962. This application Feb. 28, 1964, Ser.
No. 348,904
13 Claims. (Cl. 88—1)

This is a continuation-in-part of our prior application Ser. No. 170,579, filed Feb. 1, 1962.

The object of the present invention is to provide an improved observation port which permits observation into the interior of places which are dangerous to enter, by reason of radiation or high pressure, for example, and which provides a relatively wide field of observation, despite a diameter which is small when compared with those of conventional observation ports.

Known protective ports ordinarily comprise one or more thick parallel transparent protective panes made of a suitable glass, and occupying a space substantially equal in thickness to that of the wall in which said ports are mounted.

In such conventional observation ports, the diameter of the ports depends upon the field which it is desired to observe, and is also a function of the index of refraction of the glass used, as well as of the total thickness of the transparent protective panes.

Totally aside from the cost of these observation ports, the installation of those which permit a wide field of view require wide openings in the walls in which they must be mounted, which often poses difficult problems.

On the other hand, when the operator wishes to explore the entire field visible through the port, he is obliged to move relative to the axis thereof, or to the average position of said axis, in the case of pivotally mounted ports, so as to see through the port in the desired direction.

This necessity is often troublesome, especially when the operator is in front of a desk carrying a control panel.

The object of the present invention is to provide an observation port free from these inconveniences and capable of being made either simply for the observation of a relatively small field or, for the panoramic observation of a large field, in combination with an image reflecting device which avoids the aforementioned inconvenience.

It is known that the width of field of an optical system may be modified by using field reducing or enlarging devices, which ordinarily consists of two objectives, one of which has a negative and the other a positive focal length, separated by a distance equal to the difference between their respective focal lengths, so as to constitute in combination an afocal device.

The ratio between the absolute values of the focal lengths of the two objectives then determines the ratio of reduction or enlargement of the field.

However, the use of a field reducer also reduces the size of the image and does not permit the observer to easily locate the position of the phenomena which he sees through the port, and while such location is, on the other hand, easier with a field enlarger, which enlarges the image, this is not possible without still further increasing the section of the port and the volume of the protective panes.

The observation port according to the present invention is characterized by the combination of two devices of the field reducing-enlarging type, one of which is used as a field reducer and the other as a field enlarger, with means positioned in the spaces between the positive and negative objectives of each of these devices, that is to say in the place where the field is reduced, said means consisting of transparent glass blocks of appropriate density, so that the system constitutes an afocal system the enlargement of which may be regulated to meet one's requirements, or may be equal to one.

The combination permits a port to be provided which is smaller in size or diameter than a conventional port which does not comprise the aforesaid field reducing and enlarging means.

By adopting field reducing and enlarging ratios of one-half and two respectively, it is possible to use only one-fourth the volume of glass normally used in parallel faced ports of conventional types.

It is also possible, in accordance with the invention, to provide small panoramic ports which are capable of embracing fields of observation covering 180° in all directions, by replacing the glass blocks between the field reducing and enlarging objectives with combinations of prisms and mirrors, and filling the open spaces not occupied by said prisms, if necessary, with materials having an appropriate density and capable of stopping dangerous radiation.

It will be hereinafter seen that this modified type of port permits the moving image obtained by pivoting the mirror of a panoramic port to appear constantly in the same place so that an observer positioned behind the port can see in all directions permitted by the port, without having to move his head.

If desired, the field reducing and field enlarging devices may comprise cylindrical instead of spherical lenses. Such an observation port permits the observation of a very wide horizontal field, and a narrower vertical field, or vice versa.

Other characteristics of the present invention will be better understood from a reading of the following description of two embodiments of the improved observation port according to the invention, these embodiments being given purely by way of illustration, and being described in connection with the attached drawings in which:

FIGURE 1 is a diametral cross-section through a port of the ordinary type showing the total field which an observer can see by moving from side to side with respect to the axis of a circular port;

FIGURE 2 is a diametral section through a port according to the present invention, mounted in a wall of the same thickness as in the case of the port of FIG. 1;

FIGURE 3 is a diametral section through a port of the panoramic type according to the invention, equipped with a pivoting mirror permitting a particular field corresponding to a predetermined meridian to be explored for each setting, said port being provided with a rotatable mount which makes it possible to explore the entire field by shifting from one meridian to another;

FIGURE 4 is a perspective view of an afocal optical device comprising cylindrical lenses and normally used to explore a very large horizontal field; and FIGURE 5 is a perspective view of a similar device utilizing a prism arrangement which permits displacement of the optical axis.

As seen on FIG. 1, the port comprises a certain number of glass blocks 1 joined together and forming a cylinder mounted in an orifice in the wall 2. The transparent blocks 1 protect an operator presumed to be positioned at one of the points 3, or 3a or against any dangerous radiation emanating from the enclosure to the left of the wall 2.

In the diametral plane corresponding to FIG. 1, an observer positioned at the point 3 may be reached by rays between the extreme rays 4 and 5, which follow the paths 4, 4a, 4b, and 5, 5a, 5b, respectively, by reason of the refraction due to the presence of said glass blocks.

It is easy to understand that the field delimited by the rays 4b and 5b, which are respectively parallel to the rays 4 and 5, corresponds to the field observable from the point 3.

When the observer moves to 3a, the observable field corresponds to the rays between the rays 8 and 9 which follow the paths 8, 8a, 8b, and 9, 9a, 9b respectively.

To explore the entire field it is necessary for the observer to move away from the axis of the port, those limited positions beyond which the observer cannot explore the enclosure corresponding to the symmetrical positions indicated on FIG. 1 at 3b and 3c.

The double-headed arrows indicated by reference numerals 6 and 7 represent the field observable from the points 3 and 3a respectively.

Reference numerals 10 and 11 correspond to the extreme limits of the field observable when the observer moves from the point 3b to the point 3c.

The double-headed arrow 12 corresponds to the entire field observable between the lines 10 and 11.

Referring now to FIG. 2, on which for the sake of simplicity, the paths of the rays through the assembly have not been shown, it will be seen that the rays arriving from the enclosure pass first through a field reducing means consisting of the plano-concave lens 13 and the plano-convex lens 14.

This reduction in field is then compensated for by an increase of the same value obtained by a symmetrical optical device consisting of the plano-convex lens 15 and the plano-concave lens 16.

As has been hereinbefore indicated, each of the devices 13, 14 and 15, 16, in combination with the transparent blocks 1a or 1b, is afocal, and an observer who moves away from the median position 17 to the extreme points 17a and 17b corresponding to the possibility of exploring the extreme edges of the observable field, may explore by means of the new port a field corresponding to the double-headed arrow 18 having the same angular value as the double-headed arrow 12 of FIGURE 1.

As seen on FIG. 2, such a port permits the exploration of a field of the same width as the port shown on FIG. 1 which has twice its diameter.

With respect to the necessity for moving between the limits 17a and 17b in order to explore the entire observable field, this necessity is much less of a hardship than in the case of the port of FIG. 1 because of the smaller diameter of the new port.

This two-to-one reduction in diameter corresponds to a four-to-one reduction in the volume of the assembly of transparent protective blocks 1a and 1b as compared with that of the assembly of blocks 1 of the port shown on FIG. 1.

Referring now to the panoramic port of FIG. 3, it will be seen that the transparent blocks 1, 1a and 1b have been replaced by combinations of prisms and mirrors which produce the same number of reflections of rays between the enclosure to be explored and the plano-convex lens 14a, as between the plano-convex lens 15a and the observer behind the plano-concave lens 26a.

However, it will be noted that the mirror 19 on the side of the enclosure to be explored is in front of the plano-concave lens 13a of the field reducing means, so that the rays are reflected only four times between the lenses 13a and 14a, whereas they are reflected five times between the lenses 15a and 26a.

The assembly constituting the port is carried inside a mount having the section shown at 20 on FIG. 3, which is pivotally supported in the wall 2b for rotation within two annular ball bearings 21a and 21b, when turned by the handle 22.

Independently of this rotation of the assembly of the device and its mount 20, which takes place about the axis X-X' of the port, it is possible to simultaneously turn the mirror 19 and an inner mount 23 with respect to the mount 20. The inner mount 23 contains an assembly of prisms positioned between the lenses 15a and 16a. This rotation of the mount 23 takes place about the axis X-X', and that of the mirror 19 about the axis Y-Y'.

The handle 24 may be used to turn a shaft 25 which, through the two bevel gears 26 and 27, rotates a shaft 28, to which the mirror 19 is fixed.

This rotation takes place within a 180° angle corresponding to a like rotation of the handle 24.

The shaft 25, acting through two gears 29 and 30, also turns the mount 23 and the prisms 31, 32, 33 contained within this mount, at an angular speed equal to half that of the shaft 25.

On the other hand, the other prisms 34 and 35, which reflect light rays between the lenses 13a and 14a, are fixed within the mount 20.

The port also comprises protective blocks 36 and 37 which respectively encircle the prismatic member 34 and the mount 23.

The upper port of these blocks 36 and 37 is pierced by an orifice which admits the shaft 25.

It should be noted that the combination of prisms and mirrors constituted by the mirror 19 and the prisms 31-35 is equivalent to a conventional Wollaston device, and that the operation which consists of turning a mirror through a certain angle about a predetermined axis, and of straightening the image by turning an assembly of prisms and/or mirrors having an odd number of reflecting surfaces through an angle equal to half the angle of rotation of said mirror is also known.

However, such devices have never been used in combination with a pair of field enlarging and reducing devices, such as those constituted by the lenses 13a and 14a and by the lenses 15a and 26b respectively. Moreover, the embodiment shown on the attached drawing has the advantage of grouping the elements in a fixed position within the mount 20 and permitting actuation of the drive shaft of the mirror 19 from outside the mounting 20.

In case of necessity, it is possible to provide two supplementary blocks of protective materials 38 and 39 shown in broken lines on FIG. 3, the block 38 being mounted in a fixed position inside the mount 20, whereas the block 39 is mounted inside the mount 23 which is rotatably carried within the mount 20.

It should be noted that the support 40 which carries the mirror 19 may also be made of a material capable of affording protection against radiation.

It will also be readily understood that the simple lens members, such as 13a, 14a, 15a and 26b may each be replaced by compound members consisting of two or more lenses, so as to provide a device as free as possible from aberrations.

FIG. 3 shows that the width of the field which may be observed at any one time is of the order of 30°, the ray shown in mixed lines at 41 being emitted parallel to the axis of symmetry of the device from a point on said axis.

In this new panoramic port the operator always looks in the direction X-X', regardless of the point seen through the pivoting mirror 19, that is to say regardless of the angular positions of the mount 20 and its control arm, or the handle 24.

Instead of replacing the spherical lens members of FIG. 2 with compound members, one may substitute cylindrical lenses, as shown in FIGS. 4 and 5.

As seen in these figures, two plano-concave cylindrical lenses 13b and 16b respectively constitute elements of two symmetrical optical devices, the first of which reduces the field while the second increases it. The observer is presumed to be positioned at the right of FIG. 4 and looks in the direction of the arrow 42, the region to be observed being positioned at the left of FIG. 4.

The field reducing device also comprises a plano-convex cylindrical lens 14b, while the field enlarger comprises a plano-convex lens 15b symmetrical to 14b, each of said devices comprising also a transparent block 1c, 1d, having parallel end surfaces.

In practice, if the plano-concave lenses 13b and 16b have a focal distance equal to F, the symmetrical plano-convex lenses will have a focal distance equal to 2F, the length of the transparent blocks 1c and 1d in the direction of the arrow 42 being also chosen so that the focus of the lens 13b coincides, after allowing for the refraction in the block 1c, with the focus of the lens 14b. The focus of the lens 15b will coincide in like manner, after taking into account the refraction in the block 1d, with the focus of the lens 16b.

FIG. 5 shows two plano-concave lenses 13c and 16c and two plano-convex lenses 14c and 15c, but the transparent blocks 43c and 43d are prismatic so that the optical viewing axis may be vertically displaced from the center of the lens 13c to that of the lens 16c.

It should be noted that the inclined surfaces of the blocks 43c, 43d, may be inclined at an angle other than 45°, thus making it possible to alter the displacement of the optical axis at will. It is even possible to so shape the blocks 43c and 43d that they totally reflect the light rays twice, so as to provide for a horizontal displacement of the optical axis, while leaving the central part of the device oriented in a vertical direction.

The simple elements 13b–16b and 13c–16c may be replaced by composite elements, if desired, just as the simple elements of FIG. 2 were replaced by the composite elements of FIG. 3.

It will of course be understood that the embodiments described herein may be modified as to details, and certain elements thereof replaced by their mechanical equivalents, without thereby departing from the spirit of the invention, as defined by the following claims.

What is claimed is:

1. An improved observation port comprising in combination afocal optical field reducing and field enlarging means in optical alignment with each other, each afocal optical means comprising plano-concave and plano-convex lenses separated by a distance equal to the difference between their focal lengths, and transparent means made of a material affording protection against radiation from one side of the port to the other, said transparent means being positioned in the optical path between the plano-convex and plano-concave lenses of at least one of said field reducing and enlarging means.

2. An improved observation port as claimed in claim 1, in which the ratio between the focal lengths of the lenses in the field enlarging means is the same as the corresponding ratio in the field reducing means so that the field reducing and field enlarging means have an overall magnification ratio of 1:1.

3. An improved observation port as claimed in claim 1, in which the ratio between the focal lengths of the lenses in the field enlarging means is greater than the corresponding ratio in the field reducing means so that the field reducing and enlarging means have an overall magnification ratio greater than 1:1.

4. An improved observation port as claimed in claim 1, in which said transparent means form part of an optical assembly which reflects optical rays an odd number of times between the two lenses of said field enlarging means and an even number of times between the two lenses of said field reducing means, the portion of said optical assembly producing said odd number of reflections being rotatably mounted relative to the remainder of said assembly, and in which said port further comprises a plane mirror pivotally mounted at the end of said field reducing means remote from said field enlarging means to turn about an axis transverse to that of said port, and means for turning said pivotally mounted mirror and simultaneously turning said rotatably mounted optical assembly at a rate equal to one-half of that at which said mirror is turned.

5. An observation port as claimed in claim 4, which is mounted to rotate as a unit within an enclosure wall.

6. An improved observation port as claimed in claim 4, in which the ratio between the focal lengths of the lenses in the field enlarging means is the same as the corresponding ratio in the field reducing means so that the field reducing and field enlarging means have an overall magnification ratio of 1:1.

7. An improved observation port as claimed in claim 4, in which the ratio between the focal lengths of the lenses in the field enlarging means is greater than the corresponding ratio in the field reducing means so that the field reducing and enlarging means have an overall magnification ratio greater than 1:1.

8. An improved observation port as claimed in claim 1 in which the concave and convex surfaces of said lenses are spherical.

9. An improved observation port as claimed in claim 1 in which the concave and convex surfaces of said lenses are cylindrical, the generatrices of said cylindrical surfaces being parallel.

10. An improved observation port as claimed in claim 1 in which said lenses are in optical alignment with parallel axes and said transparent means are prisms having reflecting surfaces positioned at an angle to said axes which causes light entering one of said lenses to be reflected to the other.

11. An improved observation port as claimed in claim 1 in which the concave and convex surfaces of said lenses are cylindrical, the generatrices of said cylindrical surfaces being parallel, two corresponding members, one from each of said afocal optical means, being positioned with their optical planes parallel to each other but at a common angle to a single optical plane common to the other members of said afocal optical means, and said transparent means comprising prisms having surfaces positioned to reflect light travelling in said parallel optical planes into said common optical plane.

12. An improved observation port as claimed in claim 1 in which said plano-concave lenses are positioned at opposite ends of the optical axis of said port, with said plano-convex lenses therebetween.

13. An improved observation port as claimed in claim 1 in which said plano-convex lenses are positioned between said plano-concave lenses.

References Cited

UNITED STATES PATENTS 3,052,151   9/1962   Clave _____ 80—1

FOREIGN PATENTS 79,184   11/1919   Austria.

OTHER REFERENCES

The Reactor Handbook, vol. 2, Engineering, Technical Information Service, U.S.A.E.C., 1955, pp. 888–899.

JEWELL H. PEDERSEN, *Primary Examiner.*

W. L. SIKES, *Assistant Examiner.*